United States Patent [19]

Müller

[11] Patent Number: 4,514,654

[45] Date of Patent: Apr. 30, 1985

[54] SMALL SIZE ELECTRIC MOTOR

[75] Inventor: Rolf Müller, Deargen, Fed. Rep. of Germany

[73] Assignee: Papst Motoren GmbH & Co KG, St. Georgen, Fed. Rep. of Germany

[21] Appl. No.: 589,841

[22] Filed: Mar. 14, 1984

Related U.S. Application Data

[63] Continuation of Ser. No. 440,026, Nov. 8, 1982, abandoned, which is a continuation of Ser. No. 137,988, Apr. 4, 1980, abandoned.

[51] Int. Cl.³ ............................................. H02K 3/48
[52] U.S. Cl. ........................... 310/216; 310/40 MM; 310/114; 310/154
[58] Field of Search ............... 310/40 MM, 216–218, 310/154, 181, 112, 114, 48, 89, 268, 254, 258, 259, 261, 264, 91, 42, 46, 43, 90

[56] References Cited

U.S. PATENT DOCUMENTS

| | | | |
|---|---|---|---|
| 269,036 | 12/1882 | Fisher | 310/264 |
| 2,453,358 | 11/1948 | Bertea | 310/254 |
| 2,453,359 | 11/1948 | Bertea | 310/254 |
| 2,975,312 | 3/1961 | Ploran | 310/217 |
| 3,202,851 | 8/1965 | Zimmerle | 310/259 |
| 3,590,208 | 6/1971 | Martini | 310/217 UX |
| 3,651,355 | 3/1972 | Mason | 310/114 |
| 3,983,435 | 9/1976 | Sims | 310/217 |
| 3,984,711 | 10/1976 | Kordik | 310/181 |
| 4,169,983 | 10/1979 | Felder | 310/114 |
| 4,206,374 | 6/1980 | Goddijn | 310/114 |
| 4,221,984 | 9/1980 | Mason | 310/114 |
| 4,359,761 | 11/1982 | Papst | 310/114 |

Primary Examiner—R. Skudy
Attorney, Agent, or Firm—Michael J. Striker

[57] ABSTRACT

A small-size electromotor includes a stator and a rotor enclosed by a housing. In order to reduce weight and moment of inertia of the rotor and stator in the electric motor the rotor and the stator are formed of magnetic conductors assembled from iron sheets. The iron sheets are spaced from one another by layers of reduced magnetic conductivity, which may be layers of air or any other non-conductive material.

16 Claims, 9 Drawing Figures

SMALL SIZE ELECTRIC MOTOR

This application is a continuation of application Ser. No. 440,026, filed Nov. 8, 1982, now abandoned, which in turn is a continuation application under rule 1.60 of application Ser. No. 137,988, filed Apr. 4, 1980, now abandoned.

The invention relates to a small size electric motor consisting of at least one rotor and stator with magnetic conductors from assembled sheets.

In arrangements of the category as named, it has been known how to reduce the iron cross section by stacking only so many sheets above each other that the iron is just not being operated within the saturation zone, if it becomes necessary in such instances that adaptations of the cross sections of the magnetic flow must be effected on windings or magnets, trapping sheets for transferring the magnetic flow to the respective magnetic flow onto the respective other cross section, may be arranged vertical to the conductor sheets. The homogeneity of the magnetic field is, however, reduced at these transfer points which is particularly undesirable at the rotor air gap. Frequently, it may also be impossible, or too expensive, to provide for such transfer zone during assembly, so that the full iron cross section must be maintained. An unnecessarily high weight will result therefrom which, for design reasons, is undesirable because it will be necessitate expensive fastening means, or because large moments of inertia of the rotor may be a consequence thereof.

The disadvantage of a too high weight applies to the stator as well as to the rotor.

SUMMARY OF THE INVENTION

It is an object of the invention to reduce the weight of the motor without causing stronger inhomogeneities of the magnetic flow. According to the invention the cross section of the magnetic conductors is reduced by partially replacing the sheets by layers of reduced magnetic conductivity.

The advantage of this invention consists therefore in allowing for a transition to differing cross sections with the inhomogeneities being herein lesser than when using trapping sheets, and with a concomitant reduction in assembling expenditure. The mechanical cross section of the conductors is maintained herein so, that the resistance of such arrangements to mechanical distortion is increased when compared to thin sheet stacks assembled without joints.

The desired reduction of the net space factor may, advantageously amount to 0.7 to 0.25, preferably 0.5 to 0.33.

In general, the net space factor will be approximately equal to the median induction (B1) within the air gap, divided by the technologically possible induction in iron (BFe).

The layers of reduced magnetic conductivity may preferably be air layers established between sheets by spacing means.

Layers from non-conductive material may, however, also be provided. A plastic jacketing of the iron sheets may result in suitable weights and strengths of the arrangement.

The arrangement is particularly suitable with multiple-shaft motors.

Multiple-shaft motors are provided with a plurality of rotors within one stator. Strong variations in induction may thus occur within the stator body. In order to reduce the iron cross-section herein whilst maintaining mechanical strength, air, or layers of other such as cardboard, may be inserted herein.

It is particularly effective in cases where the stator is designed to accommodate electromagnets that the latter will determine the height of the stator stack, so that a very high weight will result with a dense sheet stack.

On the other hand the interest exists in achieving high mechanical strength in such applications that the stator is frequently used as base plate to accommodate mechanically movable actuating means, such as, for instance, in sound-tape cassette equipment.

A particularly frequent application for the invention is the application in permanently excited direct current motors with magnets of median induction, such as ceramic magnets since it is nearly always required therein, that the cross section be adapted between the magnetic conductor components and the magnets.

Essential economies can be achieved in production if the stator sheet stack is inserted into a plastic component supporting the motor bearings.

It is, however, not only within the area of the stator where the invention may be used to advantage.

If, for instance, a slotted armature is used, the iron volume of the tooth crown may be reduced at least in part.

This will, in fact, reduce the iron volume in a location where it contributes most to the moment of inertia. Motors may thus be produced which will be of a considerably more suitable price than so-called "iron-less" motors (motors with a relative low movement of inertia). Such motors may be used in applications where, for instance in wound motors for sound-tape equipment, small moments of inertia are desired (in order to protect the tape upon stopping at the end).

Reduction of the iron volume at the periphery of the rotor may, according to given circumstances, be effected in various ways.

If, for instance, the tooth crown is T shaped, one of the legs of the T may have been removed. With symmetrical stacking, conpletion into full tooth crowns will ensue in axial projection.

If this projection is provided with a radial recess at the center, detents or bonding spots of the rotor will be avoided within the magnetic field of the stator, partially compensated for, and thus suppressed.

It is also possible to provide a rotor with n number of slots wherein k number of tooth crowns will be missing in radially symmetric sequence, but with consecutive sheets being offset by one respective slot. If $2 < k < n-2$; $k,n$ being integers, a rotor with full core will result, having however one respective tooth crown only at an axial distance from k number of sheets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In FIG. 1, sheets 1000 are fastened together by spacer means 1001 and fastening means such as screws or rivets, 1002. Layers of reduce magnetic conductivity 1003 will result between sheets 1000 (air layers are shown in the drawing), such layers reducing the cross section of the iron in a vertical plane of the iron sheets 1000. A sheet bundle 100 resulting in this manner will possess high stiffness against mechanical deformation.

Figure 1:
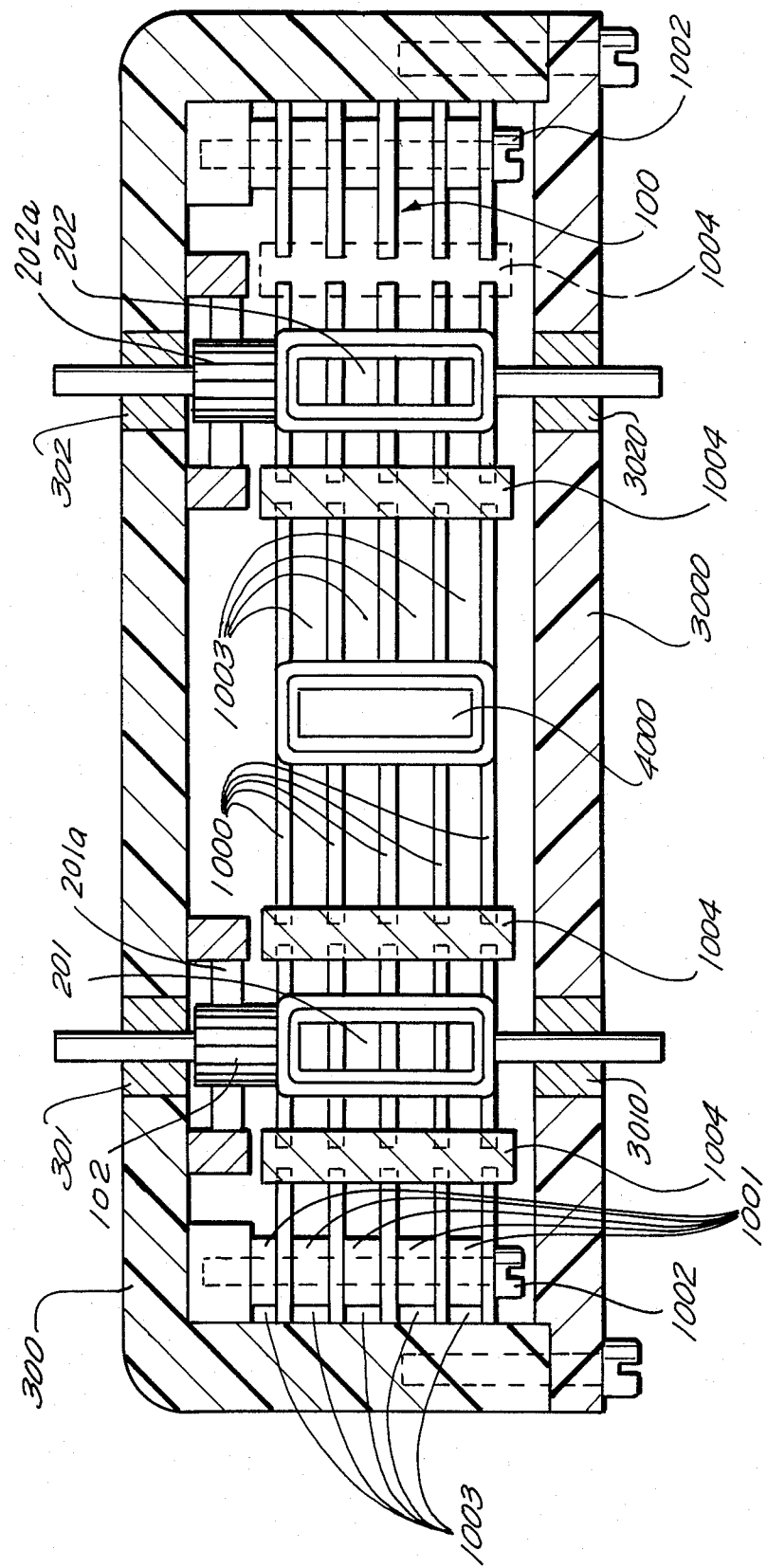
FIG. 1 shows a multiple-shaft motor in cross-section according to the invention.

Permanent magnets 1004 are inserted into the sheet stack, serving for the excitation of the direct current wound rotors 201, 202 with commutators having brushes 201a, 202a. The arrangement of the rotors 201, 202, and the common stator 100 is thus a multiple-shaft motor. In the embodiment shown in the drawing, the stator 100 is inserted into a bearing bushing 300 of plastic, supporting the motor bearings 301 and 302. The counter bearings 3010, 3020 are located within a plate 3000.

The layers of reduced magnetic conductivity 1003 may also be layers of cardboard or plastic. The plastic layers may, herein, be introduced by spraying into a finished sheet stack with air layers.

The inhomogeneities at the transition from the permanent magnets, for example barium-ferrite magnets of median induction, onto the sheets 1000 are small when compared to the use of trap sheets.

In the embodiment shown, the net-space factor is about 0,5 and may be varied upward or downward, as required by the respective circumstances.

Figure 2:
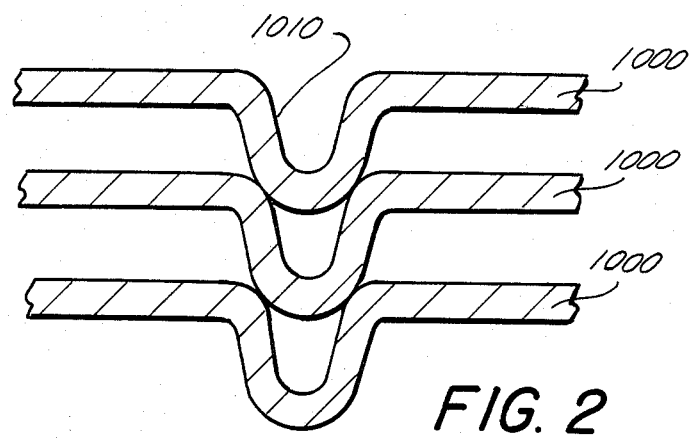
FIG. 2 shows spacer means for stators, in section.

Means 4000 may be provided within the stator sheet stack, such as, for instance, an electromagnet for the effecting of actuating sequences. The recesses may be worked into the sheets in a simple manner during stamping. A very advantageous arrangement for obtaining means of spacing is shown in FIG. 2. The recesses 1010 within the sheets 1000 are of a greater radius on the convex side than on the concave side. If the convex sides are resting directly upon the concave sides, a distance will result between the sheets 1000.

Figures 3, 4:
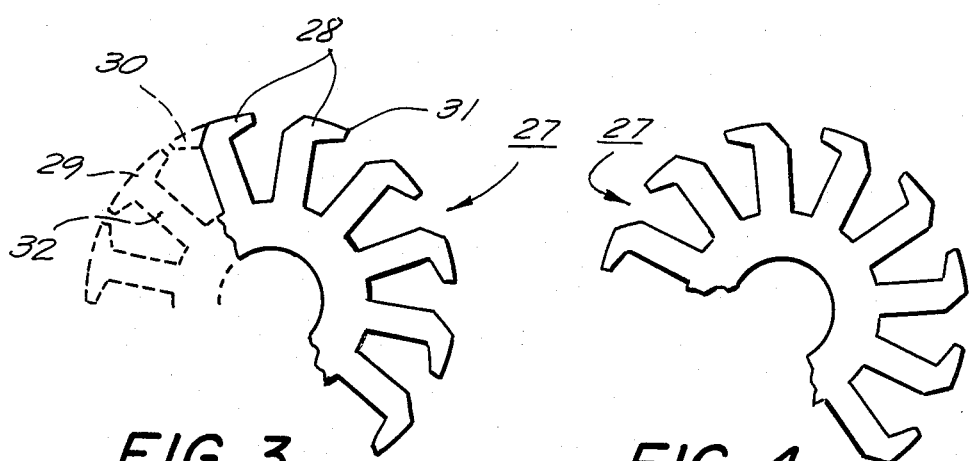
FIGS. 3 to 7 illustrate various modifications of sheet stampings for rotors.
Figure 5:
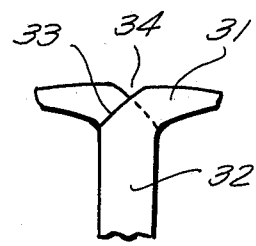

FIGS. 3–7 show various modifications of stamping used for design of the rotor. FIGS. 3 and 4 represent a stamped sheet 27. The arms 30 of the somewhat T-shaped tooth crowns 29 are obliquely cut off at a part of the rotor teeth, i.e. approximately parallel to the remaining arms, so that a material of the tooth web 32 and the remaining tooth crown 28 will overall be of approximately the same cross section. The stamped sheets 27 are stacked alternatingly, so that a sheet positioned as per FIG. 3 is succeeded by a sheet as per FIG. 4, so that the tooth crowns 29 will, in the projection as per FIG. 5, become completed into one full tooth crown. The oblique cutting line 33 obtained as a result of stamping operation may be however, advantageously selected in such a manner that a small recess 34 will result in the center of the tooth crown. In practice, this will have the effect of doubling the number of slots and will also prevent preferential positions of the rotor within the magnetic field of the stator.

Figure 6:
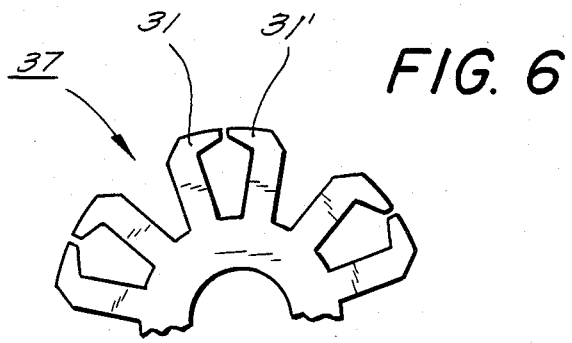

Another sheet stamping for the rotor sheets is shown in FIG. 6. The teeth crowns 29 are cut obliquely on one side of the tooth, but at the left side or at the right side of each two neighboring teeth, so that the remaining teeth crowns 31, 31', in the respective neighboring teeth are directed toward each other. When, upon stacking of the sheets, each sheet is rotated by one tooth pitch, the structure shown in FIG. 5 will result. FIG. 3 or 4 will result however, when every second sheet is reversed. This will, however, considerably impair production.

Figure 7:
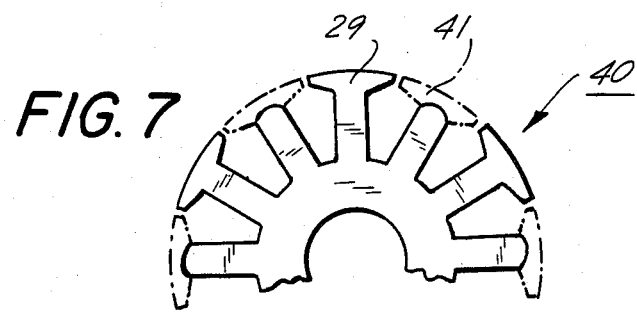

A further sheet cut for a rotor sheet is shown in FIG. 7. Every second tooth crown is completely cut out therein, whilst the intermediate tooth crowns are complete. Rotating of the consecutive shets, each by one tooth pitch will result in obtaining of the structure of the rotor as indicated by dash-dot lines 41.

The producing of sheets for rotors with cuts and positioning them as shown in FIGS. 3 to 7 will result in a reduction of the moment of axial inertia (of the rotor sheet stack) by approx. 15% to 20%. Added to this is the weight reduction achieved by thinning of the entire rotor stack by means analogous to thinning of the stator stack—so that a moment of axial inertia, strongly reduced in total, will result.

Figure 8:
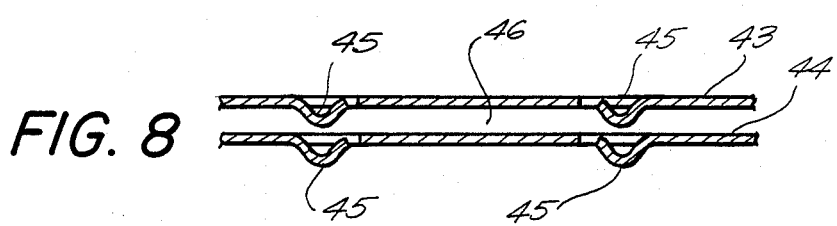
FIGS. 8 to 9 show spacer means for rotors according to the invention.

FIG. 8 shows an arrangement of spacing means for the rotor, approximately similar to the arrangement shown in FIG. 2 for the stator. Numerals 43 and 44 represent sheets for a rotor stack.

Figure 9:
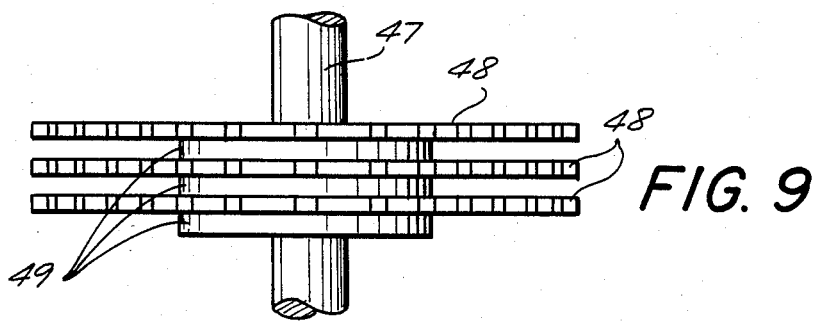

In FIG. 9, iron sheets 48 and spacer discs 49 are alternatively arranged on a rotor shaft 47. The spacer discs 49 have a very small moment of inertia, and thus also the rotor.

It will be understood that each of the elements described above, or two or more together, may also find a useful application in other types of electromotor, differing from the types described above.

While the invention has been illustrated and described as embodied in electromotors, it is not intended to be limited to the details shown, since various modifications and structural changes may be made without departing in any way from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric motor, comprising a stator; at least one wound rotor; commutator means with brushes associated with said rotor; said stator including a plurality of magnetic conductors formed of iron sheets assembled in a superimposed relation into a stator sheet stack, said rotor being inserted into the stator sheet stack and including a rotor shaft and a plurality of magnetic conductors formed of iron sheets mounted on said shaft in superimposed relation to form a rotor sheet stack; permanent magnets, inserted into the stator sheet stack and cooperating with said rotor for excitation of said rotor; first spacing means for holding the iron sheets in said stator in spaced relationship from each other, and second spacing means for holding the iron sheets in said rotor in spaced relationship from each other, the sheets of said stator sheet stack and the sheets of said rotor stack defining in assembly a cross-section of the magnetic conductors, the sheets in the stator sheet stack and the sheets in the rotor sheet stack in assembly being spaced from one another by layers of reduced conductivity extended between the respective spacing means so that said cross-section is reduced causing the reduction of the moment of axial inertia of the electric motor.

2. The motor of claim 1, wherein said magnetic conductors in said stator and said rotor have a net-space factor between 0.5 to 0.25.

3. The motor of claim 2, wherein said net-space factor is preferably 0.4 to 0.3.

4. The motor of claim 1, wherein said magnetic conductors in said rotor and said stator have a net-space factor equal to the medium induction in an air gap defined by the induction in iron.

5. The motor of claim 1, wherein said layers between said iron sheets in said stator and in said rotor are layers of air.

6. The motor of claim 1, wherein said layers are made of non-conductive material.

7. The motor of claim 1, wherein said stator includes a housing accommodating a number of rotors, having shafts and rotor sheet stacks.

8. The motor of claim 7, further including a electromagnet positioned within said stator sheet stack.

9. The motor of claim 8, wherein said housing includes a plastic element surrounding said stator sheet stack and said rotors, and a base plate connected to said element.

10. The motor of claim 9, wherein bearing means are provided which are mounted in said plastic element and said base plate, respectively, to support the respective shafts of said rotors.

11. The motor of claim 10, wherein each of said rotors includes sheets formed with radially outwardly extended slots to constitute radially extended webs each having a tooth-shaped crown at the periphery thereof whereby the volume of said rotor is reduced.

12. The motor of claim 11, wherein said tooth-shaped crown has a T-shaped configuration.

13. The motor of claim 11, wherein said tooth-shaped crown has a cut at one side thereof to form a peripherally extended projection so that all webs in one sheet have peripheral projections extended in one direction.

14. The motor of claim 13, wherein each two consecutive sheets in said rotors are positioned so that the peripherally extended projections of the webs of said sheets are directed in opposite directions and in assembly form a radial recess whereby bonding points between two adjacent sheets in said rotor sheet stack within the magnetic field are avoided.

15. The motor of claim 11, wherein said tooth-shaped crown has a cut at one side thereof to form a peripherally extended projection so that each two successive webs in one sheet have peripheral projections extended toward each other.

16. The motor of claim 12, wherein the relationship between said slots and said tooth-shaped crowns is $2 < k < n-2$, where k is a number of tooth-shaped crowns and n is a number of slots, k and n being integers, and wherein two consecutive sheets in said rotors are offset one relative to another by one respective slot.

* * * * *